US010606935B2

(12) United States Patent
Price et al.

(10) Patent No.: US 10,606,935 B2
(45) Date of Patent: Mar. 31, 2020

(54) TRANSFORMING A WEBSITE FOR DYNAMIC WEB CONTENT MANAGEMENT

(71) Applicant: International Business Machines Corporation, Armonk, NY (US)

(72) Inventors: Dana L. Price, Surf City, NC (US); Craig M. Tognarina, Forsyth, GA (US); Michael E. Vince, Mesquite, TX (US); Scott A. Will, Louisburg, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 60 days.

(21) Appl. No.: 15/914,726

(22) Filed: Mar. 7, 2018

(65) Prior Publication Data

US 2018/0196789 A1  Jul. 12, 2018

Related U.S. Application Data

(63) Continuation of application No. 14/021,753, filed on Sep. 9, 2013, now Pat. No. 10,089,284.

(51) Int. Cl.
*G06F 17/20* (2006.01)
*G06F 17/22* (2006.01)
*G06F 16/958* (2019.01)
*G06F 17/24* (2006.01)

(52) U.S. Cl.
CPC .......... *G06F 17/227* (2013.01); *G06F 16/958* (2019.01); *G06F 17/2247* (2013.01); *G06F 17/248* (2013.01)

(58) Field of Classification Search
CPC .................................................. G06F 17/2247
See application file for complete search history.

(56) References Cited

U.S. PATENT DOCUMENTS

| 7,174,506 | B1 | 2/2007 | Dunsmoir et al. | |
|---|---|---|---|---|
| 2002/0013790 | A1 | 1/2002 | Vandersluis | |
| 2002/0116421 | A1* | 8/2002 | Fox | G06F 17/21 715/201 |
| 2004/0268231 | A1* | 12/2004 | Tunning | G06F 17/2247 715/236 |
| 2005/0097008 | A1* | 5/2005 | Ehring | G06F 17/211 715/205 |
| 2007/0011650 | A1 | 1/2007 | Hage et al. | |
| 2008/0104504 | A1* | 5/2008 | Gimson | G06F 17/248 715/234 |
| 2009/0158243 | A1* | 6/2009 | Bolarinwa | G06F 9/451 717/105 |

(Continued)

OTHER PUBLICATIONS

List of IBM Patents or Patent Applications Treated as Related; Mar. 7, 2018; pp. 1-2.

(Continued)

*Primary Examiner* — Keith D Bloomquist
(74) *Attorney, Agent, or Firm* — Fabian VanCott; Steven L. Nichols

(57) ABSTRACT

Transforming a website for dynamic web content management includes identifying aspects of a static website that are to be under dynamic web content management, organizing the aspects of the static website in preparation for storing the aspects, and storing the aspects of the static website with a specific identifier.

18 Claims, 8 Drawing Sheets

(56) References Cited

U.S. PATENT DOCUMENTS

| | | |
|---|---|---|
| 2009/0282062 A1 | 11/2009 | Husic |
| 2010/0037150 A1 | 2/2010 | Sawant |
| 2010/0082441 A1 | 4/2010 | Doemling et al. |
| 2011/0055740 A1 | 3/2011 | Coleman et al. |
| 2014/0019851 A1 | 1/2014 | DeRoller |
| 2014/0082479 A1 | 3/2014 | Giomame |
| 2014/0129924 A1 | 5/2014 | Le Bescond de Coatpont |
| 2014/0201615 A1* | 7/2014 | Rajkumar ............... H04L 67/02 715/234 |

OTHER PUBLICATIONS

Coatpont; "System and Method for Rapid Creation of Web Content Management Templates"; Provisional Application No. 61/722,855 dated Nov. 6, 2012.

* cited by examiner

TRANSFORMING A WEBSITE FOR DYNAMIC WEB CONTENT MANAGEMENT

BACKGROUND

The present invention relates to transforming a website in order to place the website under dynamic web content management, and more specifically, to transforming static websites in order to place the static websites under dynamic web content management.

A static website contains web pages that are stored as HyperText Markup Language (HTML) files. The static website's web pages are stored in a file system, such as a server or a user's local file system. The static website's web pages are made available to a user over a network or directly from the user's local file system. Further, when a user accesses the static website's web pages, the static website's web pages are delivered to the user exactly as they are stored on the file system.

BRIEF SUMMARY

A method for transforming a website for dynamic web content management includes identifying aspects of a static website that are to be under dynamic web content management, organizing the aspects of the static website in preparation for storing the aspects, and storing the aspects of the static website with a specific identifier.

A method for transforming a website for dynamic web content management includes producing at least one presentation template based on a webpage for a static website using a conversion tool, identifying aspects of the static website that are to be under dynamic web content management, organizing the aspects of the static website in preparation for storing the aspects, storing the aspects of the static website with a specific identifier, and populating a web content library with web content components, hyperlinks, presentation templates, navigation nodes, content items, or combinations thereof.

A method for transforming a website for dynamic web content management includes identifying aspects of a static website that are to be under dynamic web content management, and populating a web content library with web content components, hyperlinks, presentation templates, navigation nodes, content items, or combinations thereof.

A computer program product includes a computer readable storage medium, the computer readable storage medium having computer readable program code embodied therewith. The computer readable program code having computer readable program code to identify aspects of a static website that are to be under dynamic web content management, organize the aspects of the static website in preparation for storing the aspects, and store the aspect of the static website with a specific identifier.

A system for transforming a website for dynamic web content management includes a presentation template producing engine to produce at least one presentation template based on a webpage for a static website using a conversion tool, an identification engine to identify aspects of the static website that are to be under dynamic web content management, an organizing engine to organize the aspects of the static website in preparation for storing the aspects, a storing engine to store the aspects of the static website with a specific identifier, and a population engine to populate a web content library with web content components, hyperlinks, presentation templates, navigation nodes, content items, or combinations thereof.

A system for transforming a website for dynamic web content management includes an identification engine to identify aspects of a static website that are to be under dynamic web content management, and a population engine to populate a web content library web content components, hyperlinks, presentation templates, navigation nodes, content items, or combinations thereof.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
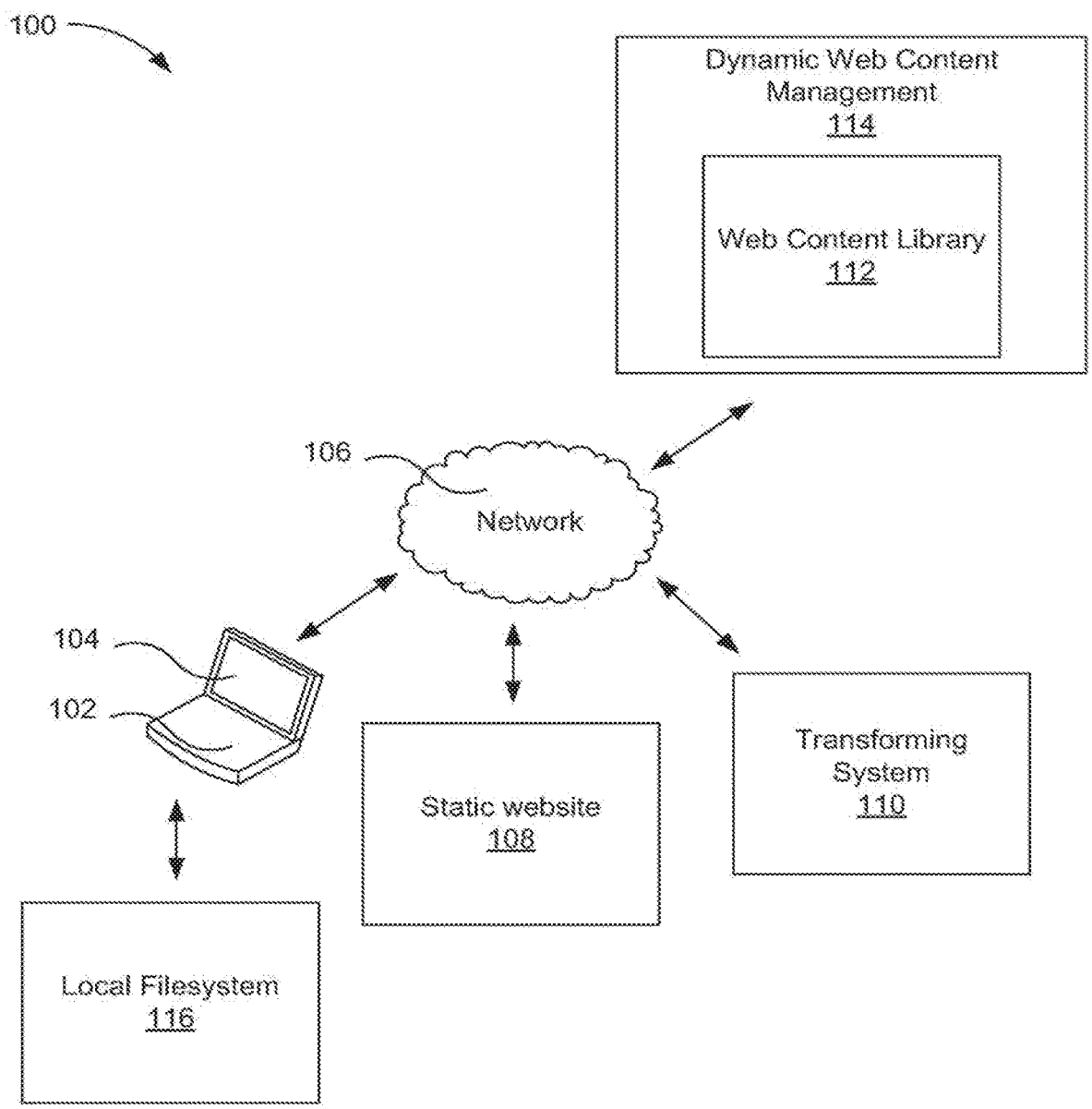
FIG. 1 is a diagram of an example of a system for transforming a website in order to place the website under dynamic web content management, according to the examples of principles described herein.

The present specification describes a system and a method for transforming a static website to place the static website under dynamic web content management by extracting the static website into artifacts to store and maintain the artifacts under dynamic web content management.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

As noted above, a static website's web pages are stored as HTML files on a file system, and made available to a user over a network or directly from the user's local file system. Further, when a user accesses the static website's web pages, the web pages are delivered to a user exactly as stored in the file system. To meet a business user's needs, a static website's web pages are to be maintained in order to display up-to-date information to a user.

Maintaining a static website can be a burdensome task. Several people with specialized skill, such as developers, web content authors, web content administrators, among others, are used to maintain a static website. A static website usually experiences several revisions to meet the needs of a business user. This can cause problems for a business user and those maintaining the static website because business users cannot make updates to a static website directly. This can lead to delays in publishing the updated static website, an increased potential for errors in the static website, and can take the developers away from working on defects and enhancements to the functionality of the static website. Further, while a business user may be trained to maintain parts of a static website, the business user will still lack the experience and in-depth skills to perform specialized technical tasks to maintain the parts of the static website.

The principles described herein include a method for transforming a website for dynamic web content management. Such a method includes identifying aspects of a static website that are to be under dynamic web content management, organizing the aspects of the static website in preparation for storing the aspects, and storing the aspects of the static website with a specific identifier. Such a method allows a user to extract aspects of a static website into artifacts to store and maintain the artifacts as part of a web content management system. As a result, a business user can maintain each artifact that is under dynamic web content management.

Further, the method can include populating a web content library with artifacts, such as hyperlinks, presentation templates, navigation nodes, content items, web content components, other artifacts, or combinations thereof. Populating the web content library will be described in more detail below.

A static website may be an existing website or a mockup website that contains web pages that are HTML files. As mentioned above, the static website's web pages are stored as HTML files on a file system, such as a server, and made available to a user over a network or directly from the user's local file system. Further, the static website's web pages are delivered to the user exactly as they stored on the file system. Additionally, a static website may include a header, a body, a footer, web content components, navigation, and content items. In one example, content items may include files, images, text, links, other content items, or combinations thereof.

An artifact may be any type of web content storage device in a web content management system. For example, an artifact may be a content item, a web content component, a presentation template, an authoring template, other artifacts, or combinations thereof.

An aspect may be a selectable section of a web page. For example, an aspect may be a header, a body, a footer, other aspects, or combinations thereof.

The term identification may be the process of selecting an explicit section of a website or the process of assigning a unique value to an artifact. The term detection may be an implicit discovery of an aspect of a website as part of an explicitly selected section of the website.

A web content component may be a specific type of web content management artifact that may include one or more artifacts as well as being able to be associated with one or more artifacts. Further a web content component may be a module that encapsulates a set of related functions or data such as content items, web content, forms, styles, JavaScript, among others. Further, a web content component may be reusable. For example, a website having a web content component in the header of one web page may be reused for each web page's header in the website. Further, a web content component may be one or more images, texts, and/or links that are encapsulated by an artifact.

A business user may be a user that interacts with a transforming system to extract a static website into artifacts to store and maintain the artifacts as part of a web content management system. As a result, a business user can maintain a static website by maintaining each artifact that is under dynamic web content management.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system (100) for transforming a website in order to place the website under dynamic web content management, according to the examples of principles described herein. As mentioned above, a static website's web pages are stored as HTML files on a file system, such as on a server, and made available to a user over a network or directly from the user's local file system. Further, when a user accesses the static website's web pages, the web pages are delivered to the user exactly as stored in the file system. Often, to meet a business user's needs, a static website's web pages are to be maintained in order to display up-to-date information to a user. As will be described below, a transforming system is used to extract a static website into artifacts in order to store and maintain the artifacts under dynamic web content management. As a result, a business user can maintain a static website by maintaining each artifact that is under dynamic web content management.

The system (100) includes a user device (102) with a display (104). In one example, a business user uses the user device (102) to access a network (106) or the business user's local file system (116). In this example, the business user loads a static website (108) onto the user device's browser. In another example, the business user loads a static website (108) onto a graphical user interface (GUI) tool on the user device (102). Further, the static website (108) may be viewed on the display (104) of the user device (102). As will be described below and in later parts of this specification, a transforming system (110) allows a business user to extract a static website into artifacts that are stored and maintained in a web content library (112) under dynamic web content management (114). As a result, a business user is allowed to create and manage multiple aspects of a static website with relative ease.

As mentioned above, the system (100) includes a transforming system (110). In keeping with the given example, the transforming system (100) allows a business user to extract a static website into artifacts that are stored and maintained in the web content library (112) under web content management (114). As a result, this enables the artifacts to be used as dynamic content. As will be described below, the transforming system (110) identifies aspects of a static website that are to be under dynamic web content management. The transforming system (110) also organizes and stores these aspects of the static website. Further, the transforming system (110) can be used to populate a web content library (112) with images, files, presentation templates, content items, navigation nodes, links, or combinations thereof. As a result, the transforming system (110) extracts aspects of the static website (108) and stores these aspects such that the aspects can be maintained as atomic reusable components. The transforming system (110) will be described in more detail below.

While this example has been described with reference to the transforming system being located over the network, the transforming system may be located in any appropriate location according to the principles described herein. For example, the transforming system may be located in a user device.

Figure 2A:
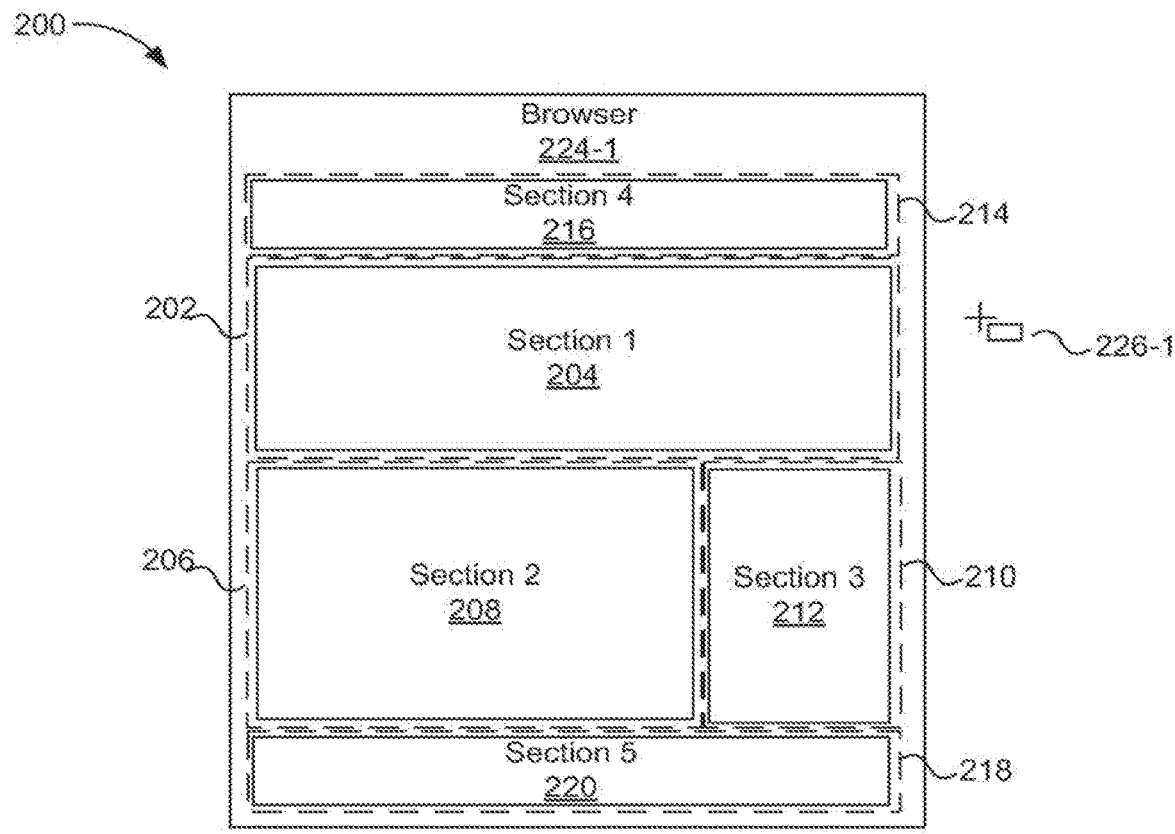
FIG. 2A is a diagram of an example of a presentation template, according to the examples of principles described herein.
Figure 2B:
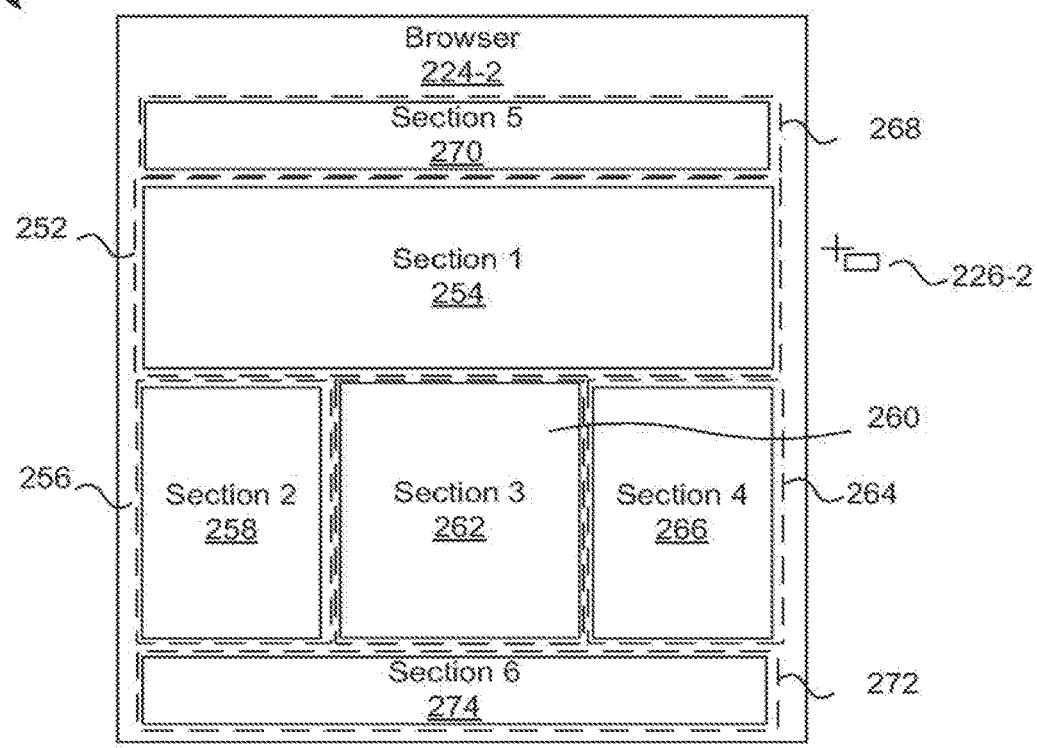
FIG. 2B is a diagram of an example of a presentation template, according to the examples of principles described herein.

FIGS. 2A and 2B are diagrams of examples presentation templates, according to the examples of principles described herein. In one example, the presentation templates may be a single presentation template or multiple presentation templates. Often, a static website has a standard presentation template that is identified for the static website's web pages. Further, a presentation template may include a single layout for all the web pages of a static website. As will be described below, the transforming system allows a business user to produce at least one presentation template based on a web page for the static website using a conversion tool. As will be described below, the conversion tool allows a user to draw a box around a section of the static website's web pages. In one example, the box may be a quadrilateral shape. As a result, a presentation template is produced for the web pages of the static website according to the sections the business user draws.

Turning specifically to FIG. 2A, after a static webpage is loaded into a browser on a user device, a user may use the conversion tool to draw a selection on the body of the static web page. In one example, the business user uses the conversion tool (226-1) to select three sections of the static website. For example, the business user draws a box (202) to indicate the drawn section is section 1 (204). The business user draws a second box (206) to indicate the drawn section is section 2 (208). Further, the business user draws a third box (210) to indicate the drawn section is section 3 (212). Further, each of the three sections (204, 208, and 212) is stored as a separate, uniquely named presentation template within the dynamic web content management. In this example the other web pages of the static website follow the same layout of the presentation template. As a result, no other presentation template is produced. However, if the static website's web pages included multiple layouts for the web pages of the static website, additional specific presentation templates may be produced for each additional web page. As will be described below, FIG. 2B may by a specific presentation template that is produced for an additional web page.

As will be described in later parts of the specification, after a presentation template is produced, a business user may use the conversion tool (226-1) to select a navigation section. For example, a business user draws fourth box (214) around section 4 (216) to indicate this section is a navigation section. In this example, section 4 (216) may be a header. Further, the business user draws a fifth box (218) around section 5 (220) to indicate that section 5 (220) is a navigation section. In this example, section 5 (220) may be a footer.

Turning specifically to FIG. 2B, as mentioned above, after a static webpage is loaded into a browser on a user device, a user may use the conversion tool to draw a selection on the body of the static web page. In one example, the business user uses the conversion tool (226-2) to select four sections of the static website. For example, the business user draws a first box (252) to indicate the drawn section is section 1 (254). The business user draws a second box (256) to indicate the drawn section is section 2 (258). Further, the business user draws a third box (260) to indicate the drawn section is section 3 (262). Finally, the business user draws a fourth box (264) to indicate the drawn section is section 4 (266). Further, each of the four sections (254, 258, 262, and 266) is stored as a separate, uniquely named specific presentation template within the dynamic web content management.

As will be described in later parts of the specification, after a specific presentation template is produced, a business user may use the conversion tool (226-2) to select a navigation section. For example, a business user draws a fifth box (268) around section 5 (270) to indicate this section is a navigation section. In this example, section 5 (270) may be a header. Further, the business user draws a sixth box (272) around section 6 (274) to indicate that section 6 (274) is a navigation section. In this example, section 6 (274) may be a footer.

Figure 3:
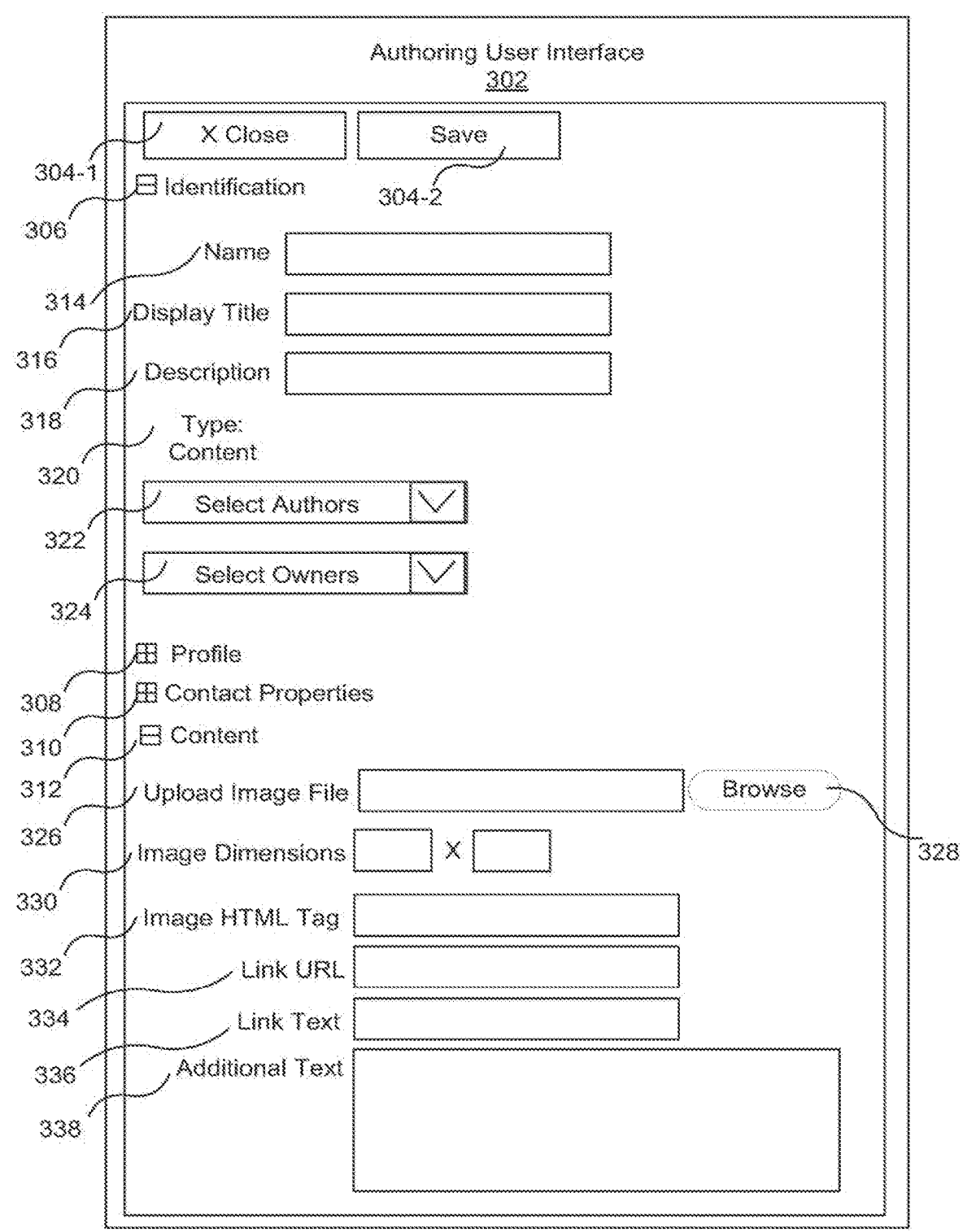
FIG. 3 is a diagram of an example of an authoring template, according to the examples of principles described herein.

FIG. 3 is a diagram of an example of an authoring template, according to the examples of principles described herein. After a presentation template is produced, an authoring template (300) is used to allow a business user to enter a finite set of content items such as rich texts components, plain text, HTML, text, links, images, other texts, or combinations thereof. As will be described below, the authoring template (300) allows the business user to create one content item or multiple content items that are to be stored in a particular location of the static website by selecting each content item using the transforming system. Further, the authoring template (300), when stored in a content web library, is mapped to a presentation template.

Turning specifically to FIG. 3, an authoring template (300) may include an authoring user interface (302). For example, the authoring user interface (302) includes a number of sections. In this example, the sections include an identification section (306), a profile section (308), a contact properties section (310), and a content section (312).

In one example, the identification section (306) allows a business user to enter in a content item's name in a name text box (314), a display title in a display title textbox (316), and a description in a description text box (318). For example, the business user may enter "Company logo" in the name text box (314), "Company X" in the display title text box (316), and "This is Company X's logo" in the description text box (318).

Further, the identification section (306) allows a business user to select the authors of the content item by selecting an author box (322). For example, three authors may be predefined, namely author 1, author 2, author 3 in the authoring user interface (302). In this example, author 1, author 2, author 3, or combinations thereof may be selected using the author box (322). In another example, more than three authors may be predefined.

Further, the identification section. (306) allows a business user to select the owners of the content item by selecting an owner box (324). For example, two owners may be predefined, namely owner 1 and owner 2 in the authoring user interface (302). In this example, owner 1, owner 2, or combinations thereof may be selected using the owner box (324). In another example, more than two owners may be predefined. Further, a business user may select a save button (304-2) to save the identification setting and any other associated metadata.

As mentioned above, the authoring user interface (302) includes a profile section (308) and a contact properties section (310). For example, the profile section (308) allows a business user to enter profile information about the content item. Further, the contact properties section (310) allows a business user to enter content property information about the content item.

In keeping with the given example, the content section (312) allows the business user to upload one or more images. In this example, the text box (304) allows the business to specify a number of properties of the image. For example, the upload image file text box (326) allows a business user to upload an image. In this example, the business user may use a browse button (328) to browse files. Further, the content section (312) includes an image dimension text box (330). For example, the image dimension text box (330) allows the business user to enter an image's dimensions such as height and width of the image.

The content section (312) further includes an image HTML tag text box (332) to allow a business user to enter an image's HTML tag name. The content section (312) further includes a link uniform resource locator (URL) text box (332) and a link text box (336) to allow a business user to enter a URL for an image as well as the link text associated with the URL.

The content section (312) may further include an additional text text box (332) to allow a business user to enter additional text related to the content item. Further, the business user may select the save button (304-2) to save the content settings and any other associated metadata. Still further, the business user may select the close button (304-1) to close the authoring user interface (302).

Figure 4:
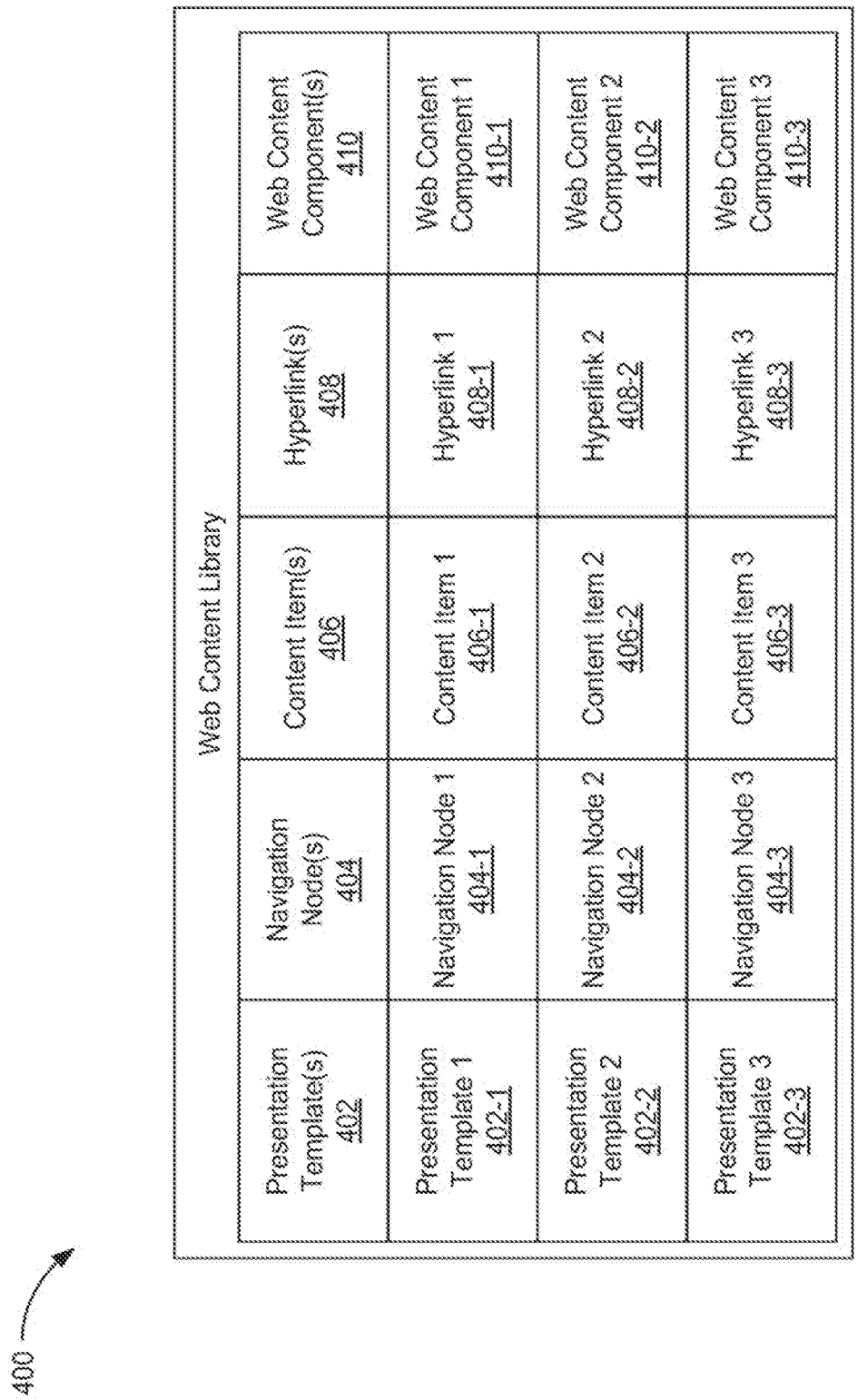
FIG. 4 is a diagram of an example of a web content library, according to the examples of principles described herein.

FIG. 4 is a diagram of an example of a web content library, according to examples of principles described herein. As mentioned above, as aspects of a static website are identified and selected by the transforming system (FIG. 1, 110), the transforming system (FIG. 1, 110) populates a web content library (400). The web content library (400) includes a presentation template (402), a navigation node (404), a content item (406), a hyperlink (408), and a web content component (410).

Turning specifically to FIG. 4, as mentioned above, a web content library (400) includes presentation templates (402) such as presentation template 1 (402-1), presentation template 2 (402-2), and presentation template 3 (402-3). Although the web content library (400) includes three presentation templates (402), in practice the web content library (400) may contain thousands of presentation templates. In one example, presentation template 3 (402-3) may be associated with an additional webpage within a static website. In this example, presentation template 3 (402-3) may be a specific presentation template for the additional webpage within the static website. Further, the presentation templates (402) have a navigation node (404) associated with each presentation template (402). For example, presentation template 1 (402-1) is associated with navigation node 1 (404-1), presentation template 2 (402-2) is associated with navigation node 2 (404-2), and presentation template 3 (402-3) is associated with navigation node 3 (404-3). More information about associating a navigation node with a presentation template will be described in later parts of this specification.

Further, the content items (406) have a navigation node (404) associated with each content item (406). For example, content item 1 (406-1) is associated with navigation node 1 (404-1), content item 2 (406-2) is associated with navigation node 2 (404-2), and content item 3 (406-3) is associated with navigation node 3 (404-3). More information about associating a navigation node with a content item will be described in later parts of this specification. Further, a content item may or may not be associated with another content item. Still further, a content item may or may not be reusable depending on the intended application of the content item. Additionally, a content item is stored as a part of a website's hierarchy.

In one example, content item 1 (406-1) is to be stored as part of the website's hierarchy. Further, content item 1 (406-1) may be associated with web content component 1 (410-1). In this example, web content component 1 (410-1) is included in content item 1 (406-1). Further, web content component 1 (410-1) indicates that content item 1 (406-1) includes an image with dimension 120×400 pixels. As mentioned above, content item 1 (406-1) is associated with navigation node 1 (404-1). Navigation node 1 (404-1) may indicate that content item 1 (406-1) is to be displayed on presentation template 1 (402-1). Further, navigation node 1 (401-1) may be associated with hyperlink 1 (408-1). For example, hyperlink 1 (408-1) is a link to navigation node 1 (404-1). In this example, hyperlink 1 (404-1) is a link to navigation node 1 (404-1) which displays content item 1 (406-1) in the center of presentation template 1 (402-1), if a business user desires to maintain content item 1 (406-1) or any of these artifacts mentioned, the business user may do so with relative ease since they are under dynamic web content management.

In another example, content item 2 (406-2) is to be stored as part of the website's hierarchy. Further, content item 2 (406-2) may be associated with web content component 2 (410-2). In this example, web content component 2 (410-2) includes information about content item 2 (406-2). Further, web content component 2 (410-2) indicates that content item 2 (406-2) is text with a font in twelve point. As mentioned above, content item 2 (406-2) is associated with navigation node 2 (404-2). Navigation node 2 (404-2) may indicate that content item 2 (406-2) is to be displayed on presentation template 2 (402-2). Further, navigation node 2 (401-2) may be associated with hyperlink 2 (408-2). In this example, hyperlink 2 (408-2) includes information about navigation node 2 (404-2). Further, hyperlink 2 (404-2) is a link to navigation node 2 (404-2) and is to display content item 2 (406-2) in section 2 of the body on presentation template 2 (402-2). If a business user desires to maintain content item 2 (406-2) or any of these artifacts mentioned, the business user may do so with relative ease since the artifacts are under dynamic web content management.

In yet another example, content item 3 (406-3) is to be stored as part of the website's hierarchy. Further, content item 3 (406-3) may be associated with web content component 3 (410-3). In one example, web content component 3 (410-3) includes information about content item 3 (406-3). Further, web content component 3 (410-3) indicates that content item 3 (406-3) is hyperlink. As mentioned above, content item 3 (406-3) is associated with navigation node 3 (404-3). Navigation node 3 (404-3) may indicate that content item 3 (406-3) is to be displayed on presentation template 2 (402-3). Further, navigation node 3 (401-3) may be associated with hyperlink 3 (408-3). For example, hyperlink 3 (408-3) is a link to navigation node 3 (404-3). In this example, hyperlink 3 (404-3) indicates that navigation node 3 (404-3) is to display content item 3 (406-3) in the footer of presentation template 3 (402-3). If a business user desires to maintain content item 3 (406-3) or any of these artifacts mentioned, the business user may do so with relative ease since the artifacts are under dynamic web content management.

While this example has been described with reference to the web content library containing presentation templates, navigation nodes, content items, hyperlinks, and web content components, a web content library may contain other information. For example, a web content library may contain images, text, links, files, taxonomy, keywords, access control lists, associated metadata, or combinations thereof.

Figure 5:
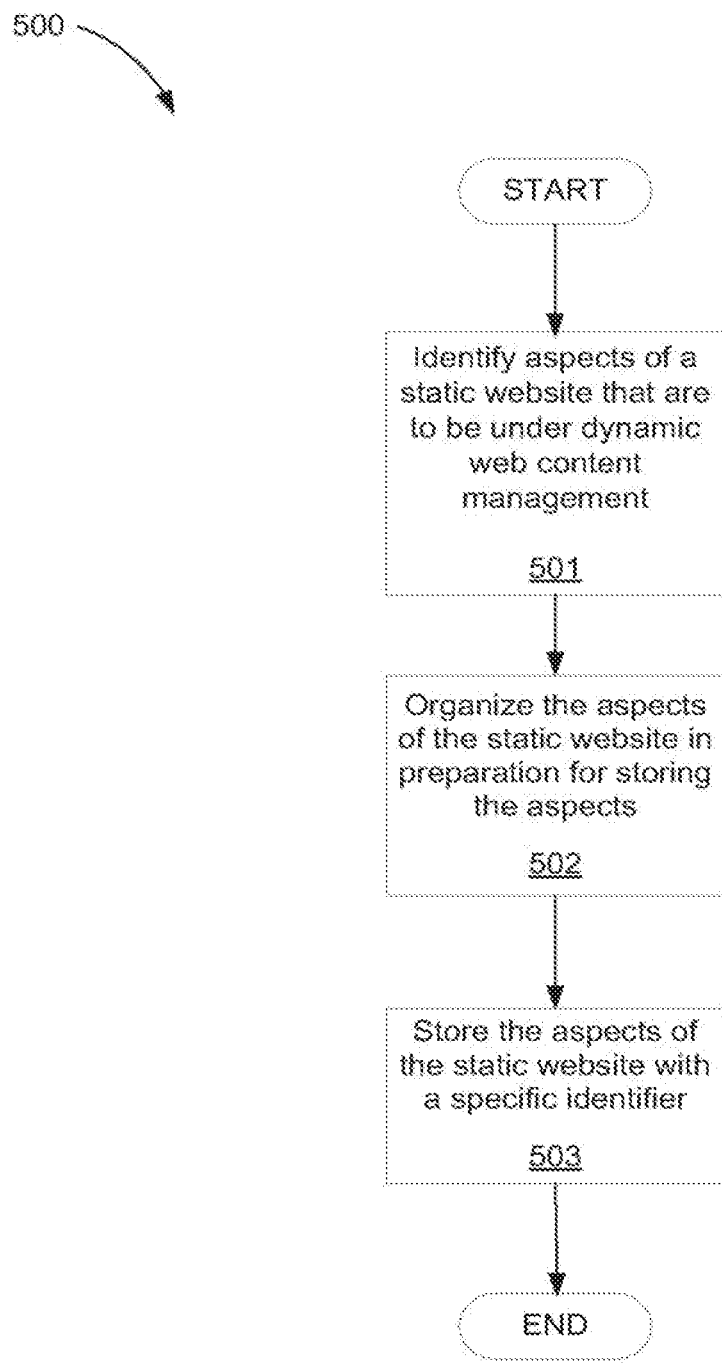
FIG. 5 is a flowchart of an example of a method for transforming a website for dynamic web content management, according to the examples of principles described herein.

FIG. 5 is a flowchart of an example of a method for transforming a website for dynamic web content management, according to the examples of principles described herein. The method for transforming a website for dynamic web content management includes identifying (501) aspects of a static website that are to be under dynamic web content management, organizing (502) the aspects of the static website in preparation for storing the aspects, and storing (503) the aspect of the static website with a specific identifier.

As mentioned above the method includes, identifying (501) aspects of a static website that are to be under dynamic web content management. For example, the method identifies aspects in a header. In this example, the header may include aspects such as a home aspect, a locations aspect, a services aspect, a products aspect, a forms aspect, a "contact us" aspect, other aspects, or combinations thereof. As a result, an artifact is identified for each aspect identified in the header.

In another example, the method (500) identifies aspects of a static website that are to be under dynamic web content management in the body of the webpage. In this example, the body of the static website may contain aspects such as rich text components. As a result, an artifact is identified for each aspect identified in the body.

In yet another example, the method (500) identifies aspects of a static website that are to be under dynamic web content management in the footer of a page. In this example, the footer may include aspects such as copyright information in the form of text. As a result, an artifact is identified for each aspect in the footer of the static website.

In another example, the aspect is identified by a user selecting an aspect. For example, if a user selects a header as an aspect, the header is identified as an aspect. Further, a user may select any appropriate section of a static website to be an aspect.

As mentioned above, the method further includes organizing (502) the aspects of the static website in preparation for storing the aspects. In one example, the aspects may be organized according to a specific identifier. In one example, a specific identifier is set to each artifact for an aspect such that a specific identifier for one artifact is unique among all other artifacts. That is example, the specific identifier will be the name of the artifact labeled by the business user. For example, the home artifact may be labeled as "home one" by the business user. Further, the location artifact that is identified may have a specific identifier such as "location two." As a result, the home artifact and the location artifact have specific identifiers that are unique between the 2 artifacts.

In another example, organizing the aspects of the static website may include a user choosing a type for the aspect. For example, a user may choose one aspect to be a header and another aspect to be a footer.

As mentioned above, the method further includes storing (503) the aspect of the static website with a specific identifier. In one example, an aspect is stored in a web content library for future maintenance as an eventual part of a dynamic website. In another example, an aspect is stored on a server, a local file system, or combinations thereof for future maintenance as an eventual part of a dynamic website. In yet another example, an aspect may be stored on a user device for future maintenance as an eventual part of a dynamic website.

In another example, a user may specify where the aspect is to be stored in the static website. For example, if the user specifies the aspect is to be stored in the footer of the first web page of the static website, the aspect is stored in the footer of the first web page of the static website.

Figure 6:
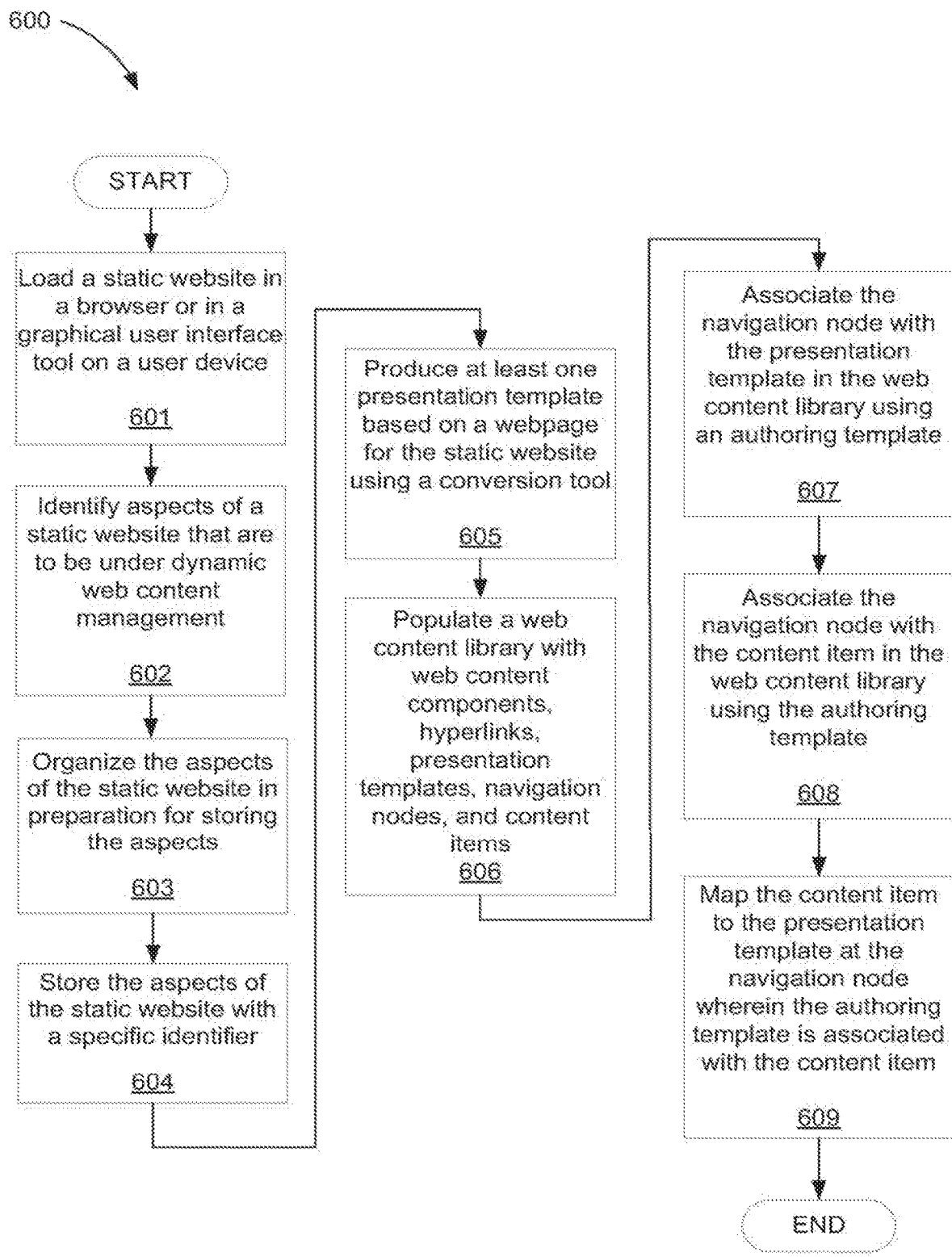
FIG. 6 is a flowchart of an example of a method for transforming a website for dynamic web content management, according to the examples of principles described herein.

FIG. 6 is a flowchart of an example of a method for transforming a website for dynamic web content management, according to the examples of principles described herein. The method (600) includes loading (601) a static website in a browser or a GUI tool on a user device, identifying (602) aspects of the static website that are to be under dynamic web content management, organizing (603) the aspects of the static website in preparation for storing the aspects, storing (604) the aspects of the static website with a specific identifier, producing (605) at least one presentation template based on a webpage for the static website using a conversion tool, populating (605) a web content library with web content components, hyperlinks, presentation templates, navigation nodes, and content items, associating (607) the navigation nodes with the presentation templates in the web content library using authoring templates, associating (608) the navigation nodes with the content items in the web content library using the authoring templates, and mapping (609) the content items to the presentation templates at the navigation nodes wherein the authoring template is associated with the content item.

As mentioned above, the method (600) includes loading (601) a static website in a browser or in a GUI tool on a user device. As mentioned above, a business user uses a user device to access a network or a local file system. In one example, the business user loads a static website onto the user device's browser or other GUI tool. Further, the static website may be viewed on the display of the user device. In another example, the entire static website is loaded onto the user device's browser or other GUI tool. In another example, a single webpage from the static website is loaded onto the user device's browser or other GUI tool. In yet another example, multiple web pages from the static website are loaded onto the user device's browser or other GUI tool. As a result, at least one web page from the static website is loaded onto the user device's browser or other GUI tool.

As mentioned above, the method further includes producing (605) at least one presentation template based on a webpage for the static website using a conversion tool. As mentioned above, the transforming system allows a business user to produce one or more presentation templates based on a webpage for the static website using a conversion tool. The conversion tool allows a user to draw a box around a section of the static website. As a result, the section drawn represents a section of a presentation template. In one example, the presentation template may have a single section. In another example, the presentation template may have multiple sections. For example, the presentation template may have a section for the static website's header. Further, the presentation template may have multiple sections for the static website's body. Still further, the presentation template may have a section for the static website's footer.

As mentioned above, the method (600) further includes populating (606) a web content library with the web content components, hyperlinks, presentation templates, content items, and navigation nodes. As mentioned above, the web content library is used to store and maintain the web content components, the hyperlinks, the presentation templates, the content items, and the navigation nodes for each artifact. For example, if an artifact is changed, the web content library will update all relevant information for the artifact.

In one example, a web content component may be first stored on a local file system. In this example, a detection engine may interrogate the directory structure of the local file system where the web content component was stored and load the web content component into the web content library.

In another example, a hyperlink may be first stored on a local file system. In this example, a detection engine may interrogate the directory structure of the local file system where the hyperlinks were stored and load the hyperlinks into the web content library.

As mentioned above, the method (600) further includes associating (607) the navigation node with the presentation template in the web content library using an authoring template. As mentioned above, the authoring template may be used to associate a navigation node such as home with a presentation template. In another example, the authoring template may be used to associate a navigation node such as "contact us" with a specific presentation template. For example, a presentation template may be first stored on a local file system. In this example, a detection engine may interrogate the directory structure of the local file system where the presentation template was stored and associate a navigation node with the presentation template. Further, the presentation template and the navigation node may then be loaded into the web content library.

As mentioned above, the method (600) further includes associating (608) the navigation node with the content item in the web content library using the authoring template. In one example, the authoring template may be used to associate a navigation node such as "contact us" with the content items for a "contact us". For example, the content items for "contact us" may include a phone number, an address, an email, other forms of communication, or combinations thereof. In this example, a navigation node may be first stored on a local file system. Further, a detection engine may interrogate the directory structure of the local file system where the navigation node was stored and associate the navigation node with a content item. Further, the content item and the navigation node may then be loaded into the web content library.

As mentioned above, the method (600) further includes mapping (609) the content item to the presentation template at the navigation node wherein the authoring template is associated with the content item. In one example, a content item such as an image is mapped to a presentation template. In this example, the presentation template is for a home page of the webpage of the static website. As mentioned above, a presentation template may be first stored on a local file system. Further, a detection engine may interrogate the directory structure of the local file system where the presentation template was stored and map the content item to the presentation template at the navigation node. Further, the presentation template, the content item, and the navigation node may then be loaded into the web content library.

Figure 7:
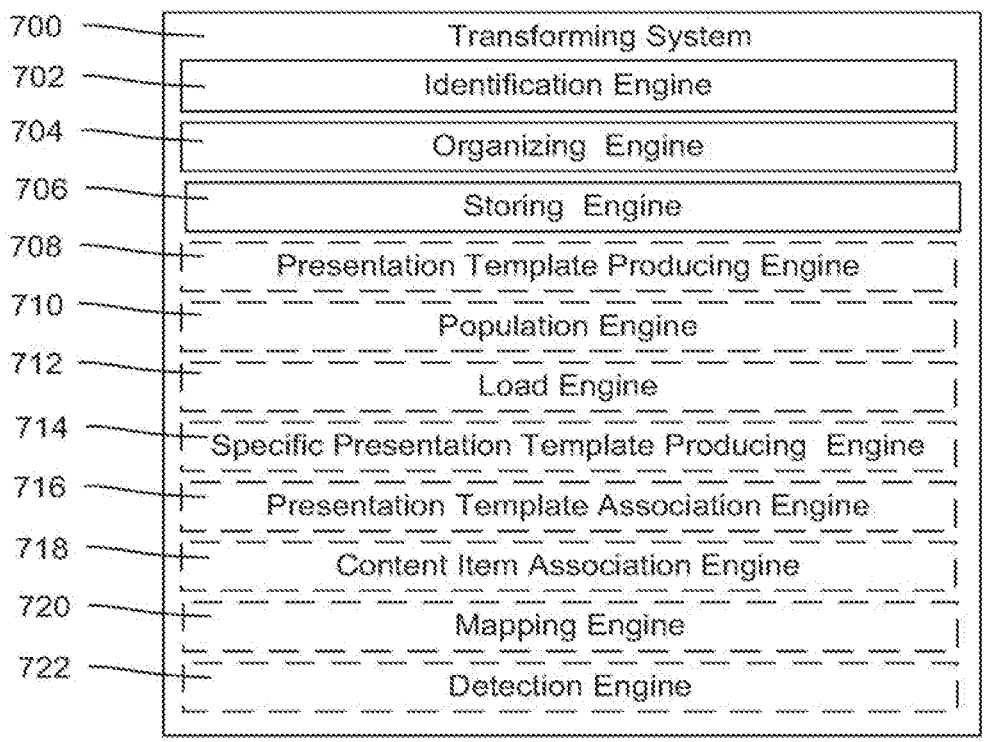
FIG. 7 is a diagram of an example of a transforming system, according to the examples of principles described herein.

FIG. 7 is a diagram of an example of a transforming system, according to the examples of principles described herein. The transforming system (700) includes an identification engine (702), an organizing engine (704), and a storing engine (706). In this example, the system (700) also includes a presentation template producing engine (708), a population engine (710), a loading engine (712), a specific presentation template producing engine (714), a presentation template association engine (716), a content item association engine (718), a mapping engine (720), and a detection engine (722). The engines (702, 704, 706, 708, 710, 712, 714, 716, 718, 720, and 722) refer to a combination of hardware and program instructions to perform a designated function. Each of the engines (702, 704, 706, 708, 710, 712, 714, 716, 718, 720, and 722) may include a processor and memory. The program instructions are stored in the memory and cause the processor to execute the designated function of the engine.

The identification engine (702) identifies aspects of a static website that are to be under dynamic web content management. In one example, an aspect may be a news web content component. In another example, an aspect may be a frequently asked questions (FAQ) web content component. In yet another example, an aspect may be a product web content component.

The organizing engine (704) organizes an aspect of a static website with a specific identifier. For example, organizing the aspects of the static website may include a user choosing a type for the aspect. For example, a user may choose one aspect to be a header and another aspect to be a footer. As a result, an aspect may be organized according to the type of the aspect.

The storing engine (706) stores an aspect of the static website with a specific identifier for future maintenance as an eventual part of a dynamic website. In one example, an aspect is stored in a web content library. In another example, an aspect is stored on a server, a local file system, or combinations thereof. In yet another example, an aspect may be stored on a user device.

The presentation template producing engine (708) produces a presentation template. In one example, a business user uses a conversion tool to select at least one section of the static website. In one example, the presentation template may have one section. In another example, the presentation template may have multiple sections.

The population engine (710) populates a web content library. As mentioned above, the web content library may be populated for each artifact. For example, a web content component, a hyperlink, a presentation template, a navigation node, a content item, or combinations thereof may be populated in a web content library.

The loading engine (712) loads a static website in a browser or other GUI tool on a user device. For example, the entire static website is loaded onto the user device's browser or other GUI tool. In another example, a single webpage from the static website is loaded onto the user device's browser or other GUI tool. In yet another example, multiple web pages from the static website are loaded onto the user device's browser or other GUI tool. As a result, at least one web page from is static website is loaded onto the user device's browser or other GUI tool.

The specific presentation template producing engine (714) produces a specific presentation template. As mentioned above, each web page of a static website may not follow the same layout. As a result, a specific presentation template is produced for each subpage of the website. In one example, the specific presentation template may have one section. In another example, the specific presentation template may have multiple sections.

The presentation template association engine (716) associates a presentation template with a navigation node. For example, an authoring template may be used to associate a navigation node such as home navigation node with a presentation template one.

The content item association engine (718) associates a content item with a navigation node. In one example, an authoring template may be used to associate a navigation node such as "contact us" navigation node with the content items for "contact us."

The mapping engine (720) maps a content item to a presentation template at a navigation node wherein an authoring template is associated with the content item. In one example, a content item such as an image is mapped to a presentation template at a navigation node wherein an authoring template is associated with the image.

The detection engine (722) detects an implicit discovery of an aspect of a website as part of an explicitly selected section of the website. In one example, the detection engine interrogates what is captured by the transforming system if there are certain aspects that are to be stored separately from the presentation template. For example, content items, navigation, files, and web content components are to be stored separately from the presentation template.

Figure 8:
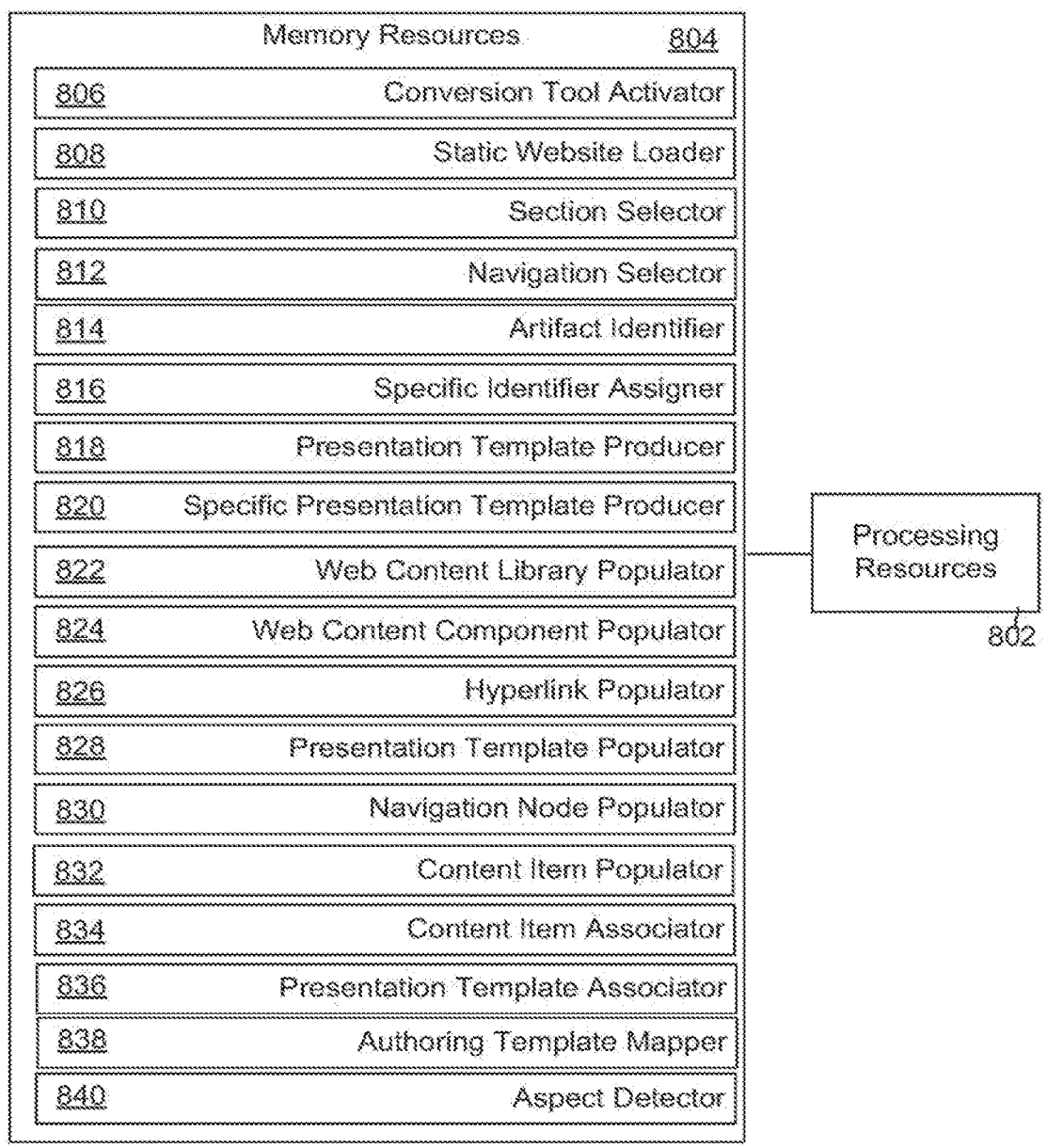
FIG. 8 is a diagram of an example of a transforming system, according to the examples of principles described herein.

FIG. 8 is a diagram of an example of a transforming system, according to the examples of principles described herein. In this example, the transforming system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the transforming system (800). The programmed instructions shown stored in the memory resources (804) include a conversion tool activator (806), a static website loader (808), a section selector (810), a navigation selector (812), an artifact identifier (814), a specific identifier assigner (816), a presentation template producer (818), a specific presentation template producer (820), a web content library populator (822), a web content component populator (824), a hyperlink populator (826), a presentation template populator (828), a navigation node populator (830), a content item populator (832), a content item associator (834), a presentation template associator (836), an authoring template mapper (838), and an aspect detector (840).

The memory resources (804) include a computer readable storage medium that contains computer readable program code to cause tasks to be executed by the processing resources (802). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The conversion tool activator (806) represents programmed instructions that, when executed, cause the processing resources (802) to activate a conversion tool. The static website loader (808) represents programmed instructions that, when executed, cause the processing resources (802) to load a static website in a browser on a user device. The section selector (810) represents programmed instructions that, when executed, cause the processing resources (802) to select a section of a static website. The navigation selector (812) represents programmed instructions that, when executed, cause the processing resources (802) to select a navigation section of the static website. The artifact identifier (814) represents programmed instructions that, when executed, cause the processing resources (802) to identify artifacts in the static website. The specific identifier assigner (816) represents programmed instructions that, when executed, cause the processing resources (802) to assign a specific identifier to each artifact in the static website. The presentation template producer (818) represents programmed instructions that, when executed, cause the processing resources (802) to produce a presentation template. The specific presentation template producer (820) represents programmed instructions that, when executed, cause the processing resources (802) to produce a specific presentation template.

The web content library populator (822) represents programmed instructions that, when executed, cause the processing resources (802) to populate a web content library. The web content component populator (824) represents programmed instructions that, when executed, cause the processing resources (802) to populate the web content library with a web content component. The hyperlink populator (826) represents programmed instructions that, when executed, cause the processing resources (802) to populate the web content library with a hyperlink. The presentation template populator (828) represents programmed instructions that, when executed, cause the processing resources (802) to populate the web content library with a presentation template. The navigation node populator (830) represents programmed instructions that, when executed, cause the processing resources (802) to populate the web content library with the navigation node. The content item populator (832) represents programmed instructions that, when executed, cause the processing resources (802) to populate the web content library with a content item.

The content item associator (834) represents programmed instructions that, when executed, cause the processing resources (802) to associate a content item with a navigation node. The presentation template associator (836) represents programmed instructions that, when executed, cause the processing resources (802) to associate a presentation template with a navigation node. The authoring template mapper (838) represents programmed instructions that, when executed, cause the processing resources (802) to map a content item to a presentation template at a navigation node. The aspect detector (840) represents programmed instructions that, when executed, cause the processing resources (802) to detect if there are certain aspects that are to be stored separately from the presentation template.

Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (804) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries, may be accessed from a remote location aver a network connection while the programmed instructions are located locally. Thus, the transforming system (800) may be implemented on a user device, on a server, on a collection of servers, or combinations thereof.

The transforming system (800) of FIG. 8 may be part of a general purpose computer. However, in alternative examples, the transforming system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A system for transforming a website for dynamic web content management, said system comprising:
  a dynamic web content management system comprising a server;
  a web content library stored and managed in memory of the dynamic web content management system;
  a network interface for communicating via a network;

the dynamic web content management system being programmed to:
receive identification of elements of a number of pages of a static website that define a number of presentation templates, wherein a number of presentation templates are defined, each corresponding to a different page of the static website, and wherein identification of said elements includes a number of boxes drawn on a display of a page of the static website by a user to define a specific presentation template;
receive identification of web content items of the static website that are to be under dynamic web content management;
store said number of presentation templates and said content items in the web content library in association with a number of navigation nodes, each navigation node identifying a corresponding presentation template on which a corresponding web content item is to be displayed; and
present a dynamic version of the static website using the web content library.

2. The system of claim 1, further comprising, in the web content library, a number of hyperlinks that each link to a corresponding navigation node stored in the web content library.

3. The system of claim 1, further comprising, in said web content library, a number of web content components that each further define a corresponding content item.

4. The system of claim 3, further comprising an authoring user interface with fields for input information of a web content component defining the corresponding content item.

5. The system of claim 1, wherein one of the boxes is designated as any of: a navigation section, a header and a footer.

6. The system of claim 1 for transforming a website for dynamic web content management, said system further comprising:
a processor;
a memory associated with the processor;
a network interface for connecting the processor to a network; and
a user interface;
the processor to, using programing from the memory,
receive user input via the user interface, the user input comprising an identification of elements of a page of a static website that define a presentation template;
receive further user input via the user interface, the further user input comprising an identification of web content items of the static website that are to be under dynamic web content management; and,
cooperating with the server, store said presentation template and said content items in the web content library.

7. The system of claim 6, the processor to load a display of the static website in a browser, wherein receiving said identification of elements and web content items of the static web page is performed with a graphical user interface (GUI) tool.

8. The system of claim 6, the processor to produce a specific presentation template for an additional webpage within said static website.

9. The system of claim 6, the processor to store a navigation node in association with said presentation template and one of said web content items, said navigation node identifying the corresponding presentation template on which the corresponding web content item is to be displayed.

10. The system of claim 9, the processor to, in the web content library, store a web content component that further defines a corresponding content item.

11. The system of claim 10, wherein said web content component defines the corresponding content item as including an image of a specified size.

12. The system of claim 9, the processor to store a hyperlink in the web content library that links to a corresponding navigation node stored in the web content library.

13. The system of claim 9, the processor to associate said navigation node with said corresponding content item in said web content library using an authoring user interface with fields for inputting information defining the corresponding content item.

14. The system of claim 1 for transforming a website for dynamic web content management, said system further comprising:
a processor;
a memory associated with the processor;
a network interface for connecting the processor to a network; and
a user interface;
the processor to, using programing from the memory, implement:
an identification engine to identify aspects of a static website that are to be under dynamic web content management; and
a population engine to populate the web content library with web content components, hyperlinks, presentation templates, navigation nodes, content items, or combinations thereof.

15. The system of claim 14, the processor to further implement an organizing engine to organize said aspects of said static website in preparation for storing said aspects; and a storing engine to store said aspects of said static website with a specific identifier.

16. The system of claim 14, the processor to further implement a presentation template producing engine to produce at least one presentation template based on a webpage for said static website using a conversion tool.

17. The system of claim 14, the processor to further implement:
a presentation template association engine to associate said navigation node with said presentation template in said web content library using an authoring template; and
a content item association engine to associate said navigation node with said content item in said web content library using said authoring template.

18. The system of claim 14, the processor to further implement a mapping engine to map said content item to said presentation template at said navigation node wherein said authoring template is associated with said content item.

* * * * *